US010122808B2

(12) United States Patent
Vickrey et al.

(10) Patent No.: US 10,122,808 B2
(45) Date of Patent: Nov. 6, 2018

(54) DETERMINING AN AUDIENCE OF USERS TO ASSIGN TO A POSTED CONTENT ITEM IN AN ONLINE SYSTEM

(71) Applicant: Facebook, Inc., Menlo Park, CA (US)

(72) Inventors: David Vickrey, Mountain View, CA (US); Khalid Bakry El-Arini, Fremont, CA (US)

(73) Assignee: Facebook, Inc., Menlo Park, CA (US)

( * ) Notice: Subject to any disclaimer, the term of this patent is extended or adjusted under 35 U.S.C. 154(b) by 257 days.

(21) Appl. No.: 15/095,007

(22) Filed: Apr. 8, 2016

(65) Prior Publication Data
US 2017/0295249 A1 Oct. 12, 2017

(51) Int. Cl.
G06F 15/16 (2006.01)
H04L 29/08 (2006.01)
H04L 29/06 (2006.01)
G06F 17/30 (2006.01)

(52) U.S. Cl.
CPC .......... H04L 67/22 (2013.01); G06F 17/3053 (2013.01); H04L 65/403 (2013.01)

(58) Field of Classification Search
CPC .... G06Q 10/10; G06Q 10/109; G06Q 10/107; H04L 29/06; H04L 29/08072; H04L 29/06027; H04L 12/581; H04L 12/1822; G06F 3/0481
USPC ........................................................ 709/204
See application file for complete search history.

(56) References Cited

U.S. PATENT DOCUMENTS

| | | | | |
|---|---|---|---|---|
| 9,894,028 | B2* | 2/2018 | Chen | H04L 51/32 |
| 2010/0058410 | A1* | 3/2010 | Rance | H04N 7/173 |
| | | | | 725/109 |
| 2012/0166532 | A1* | 6/2012 | Juan | G06Q 30/0224 |
| | | | | 709/204 |
| 2012/0265758 | A1* | 10/2012 | Han | G06F 17/30038 |
| | | | | 707/737 |
| 2012/0266081 | A1* | 10/2012 | Kao | G06Q 50/01 |
| | | | | 715/751 |
| 2013/0290430 | A1* | 10/2013 | Yung | H04L 67/22 |
| | | | | 709/204 |
| 2014/0089816 | A1* | 3/2014 | DiPersia | G06F 3/0484 |
| | | | | 715/753 |
| 2015/0012926 | A1* | 1/2015 | Wei | H04N 21/26258 |
| | | | | 725/9 |
| 2017/0063774 | A1* | 3/2017 | Chen | H04L 51/32 |
| 2017/0193120 | A1* | 7/2017 | Yung | H04L 67/22 |

* cited by examiner

Primary Examiner — Mahran Abu Roumi
(74) Attorney, Agent, or Firm — Fenwick & West LLP

(57) ABSTRACT

An online system receives a posted content item from a posting user. The online system labels the posted content item with an audience, the audience being a subset of a group of users having an affinity to a topic of the online system, the subset of the group of users sharing a particular treatment regarding the topic. After identifying an opportunity to present content to a viewing user, the online system selects candidate content items, and scores each candidate content item by determining whether the candidate content item is associated with an audience that includes the viewing user, and if so, modifying the score of the candidate content item to be higher. The online system ranks the candidate content items based on the associated score, selects a subset of the candidate content items based on the associated ranking, and presents the selected subset to the viewing user.

20 Claims, 3 Drawing Sheets

DETERMINING AN AUDIENCE OF USERS TO ASSIGN TO A POSTED CONTENT ITEM IN AN ONLINE SYSTEM

BACKGROUND

This invention relates generally to selecting content for presentation to users, and more specifically to determining a subset audience of a topic to assign to a posted content item.

Various online systems provide content to client devices for presentation to online system users via one or more networks. An online system may select content for presentation to a user based on information about the user maintained by the online system. For example, an online system allows a user to establish connections between other users and to provide content to the online system, which provides the content to the other users connected to the user. The increasing popularity of online systems, and the significant amount of user-specific information maintained by online systems, allow users of an online system allows to easily communicate information about themselves to other users and share content with other users.

In particular, to present content items to a user, the online system may determine for the user content items and other connections that the user has interacted with in the online system. Based on these interactions, the online system may determine a candidate set of content items to present to the user. However, although the online system is able to determine a topic that the user may be interested in, and thus content items related to the topic, the online system may not have properly determined the particular treatment that a user has for that topic. For example, the online system may have determined that a user is interested in the topic of climate change, due to the user interacting with a threshold number of other content items that have the keyword "climate change," but the online system cannot determine whether the user is for or against climate change. If the online system presents a content item to a user which is related to the topic that the user is interested in, but opposite to the treatment of the user regarding the topic, the user may find the content item undesirable and not rely on the online system to discover content of interest.

SUMMARY

An online system presents content to viewing users of the online system, which may be posted by posting users (who themselves may also be viewing users). When presenting content items to viewing users, the online system determines the content items that are most likely to interest the viewing user. These content items may be ones that a viewing user has previously interacted with, content items that other users connected to the viewing user have interacted with, and so on. In particular, the online system also analyzes the topic of each content item, and selects content items with topics that the online system has determined are of interest to the user. The online system may determine that a user is interested in a topic because that user has frequently interacted with other content in the online system related to that topic.

Although a viewing user may be interested in a topic, users that are interested in a topic can have multiple viewpoints, treatments, opinions, beliefs, and other consensus about that particular topic. For example, on the topic of social democracy, some users may be for social democracy, while others may be against it. These groups of users with different treatments regarding a topic may be categorized into distinct audiences. Thus, the online system, in one embodiment, also determines the audience of a posted content item and presents that content item to users that belong to the same audience. For example, the online system may only present pro-social democracy content to users that support social democracy.

In particular, the online system receives a posted content item from a posting user. The posting user may be an organization, such as a news organization. The online system determines an audience for this posted content item. The online system may provide an interface to the posting user to indicate the audience. The online system may also determine the audience based on user feedback (e.g., surveys) from users of the online system. In another example, the online system determines the audience based on the similarity of the posted content item with other content items of the online system that have been associated with an audience. The online system may also determine an audience for the posted content item based on a classification model, with the features of the model including the keywords of the posted content item and the characteristics of the posting user.

Once the online system identifies an opportunity to present content to a viewing user, the online system determines one or more candidate content items. These candidate content items may be selected from one or more content sources. In one case, the online system selects as a content source the content items that are associated with the same audiences that the viewing user belongs to. The online system may utilize other sources as well, such as sources describing the actions made by the user's connections, and so on.

The online system scores each of the candidate content items. To score each candidate content item, the online system may determine whether the candidate content item is associated with an audience that the viewing user belongs to. If so, the online system increases the score for that candidate content item. The increase in the score may be proportional to the similarity of the viewing user to other users of that audience, or based on feedback from the viewing user. If the candidate content item is not associated with any audience that the viewing user belongs to, the online system may also decrease the score for that candidate content item. After scoring each candidate content item, the online system ranks the candidate content items by the score, and selects a subset of these (e.g., top 15) to present to the viewing user. When presenting the selected content items to the viewing user, the online system may further indicate to the user the particular audience associated with the content item.

By presenting content items associated with the audience that a viewing user belongs to, the online system is able to present more relevant content to a viewing user and which encourages the user to utilize and spend more time with the online system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
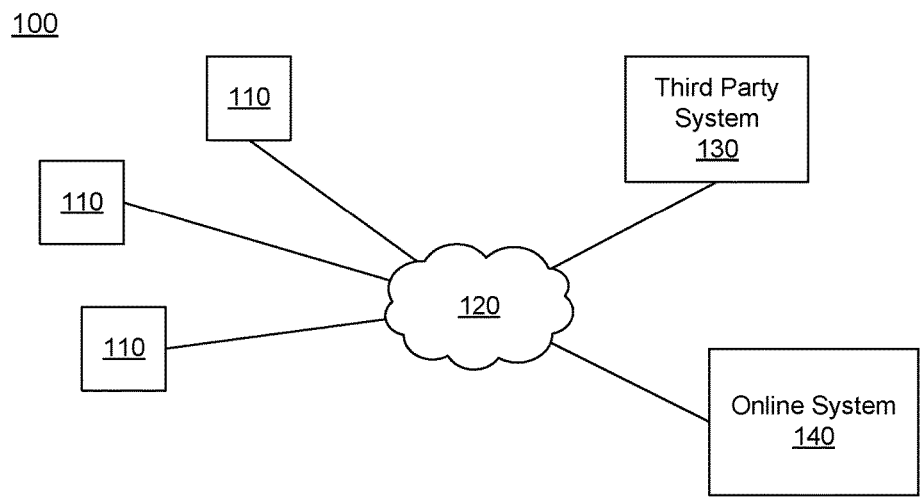
FIG. 1 is a block diagram of a system environment in which an online system operates, in accordance with an embodiment of the invention.

FIG. 1 is a high level block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are not online systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, a third party system 130 may provide content such as news articles related to a particular topic to the online system. A third party website 130 may also communicate information to the online system 140, such as advertisements, content, or information about an application provided by the third party website 130.

Figure 2:
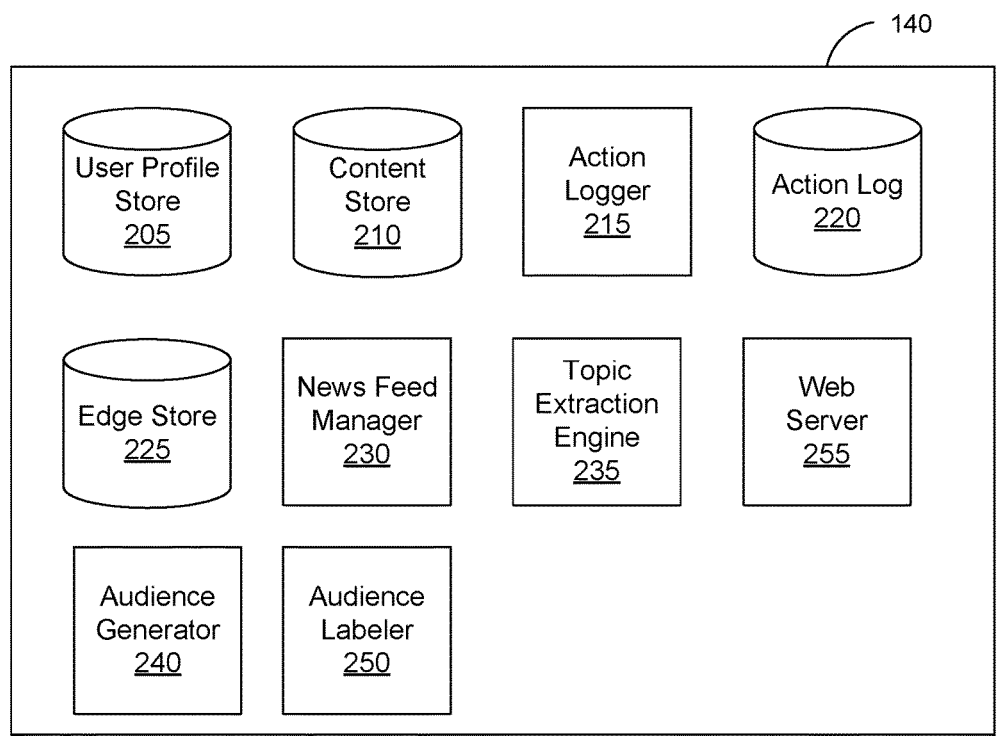
FIG. 2 is a block diagram of an online system, in accordance with an embodiment of the invention.

FIG. 2 is an example block diagram of an architecture of the online system 140. The online system 140 shown in FIG. 2 includes a user profile store 205, a content store 210, an action logger 215, an action log 220, an edge store 225, newsfeed manager 230, topic extraction engine 235, audience generator 240, audience labeler 250, and a web server 255. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 205 may also maintain references to actions by the corresponding user performed on content items in the content store 210 and stored in the action log 220.

In one embodiment, each user profile stores one or more audiences for which the user belongs. An audience is a group of users who have a shared belief, particular treatment, attitude, opinion, view, or otherwise have a similar consensus regarding a particular topic, and will be described in further detail below.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system using a brand page associated with the entity's user profile. Other users of the online system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system, events, groups or applications. In some embodiments, objects are received from third-party applications or third-party applications separate from the online system 140. In one embodiment, objects in the content store 210 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140. In one embodiment, the content store 210 stores for one or more stored content items an audience indicator for the content item. Additional details regarding audience indicators will be described below.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions are stored in the action log 210. Examples of interactions with objects include: commenting on posts, sharing links, and checking-in to physical locations via a mobile device, accessing content items, and any other interactions. Additional examples of interactions with objects on the online system 140 that are included in the action log 220 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website that primarily sells sporting equipment at bargain prices may recognize a user of an online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, an edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system, sharing a link with other users of the online system, and commenting on posts made by other users of the online system.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

In one embodiment, the online system 140 identifies stories likely to be of interest to a user through a "newsfeed" presented to the user. A story presented to a user describes an action taken by an additional user connected to the user and identifies the additional user. In some embodiments, a story describing an action performed by a user may be accessible to users not connected to the user that performed the action. The newsfeed manager 230 may generate stories for presentation to a user based on information in the action log 220 and in edge store 225 or may select candidate stories included in content store 210. One or more of the candidate stories are selected and presented to a user by the newsfeed manager 230.

For example, the newsfeed manager 230 receives a request to present one or more stories to an online system user. The newsfeed manager 230 accesses one or more of the user profile store 105, the content store 110, the action log 120, and the edge store 130 to retrieve information about the identified user. For example, stories or other data associated with users connected to the identified user are retrieved. The retrieved stories or other data is analyzed by the newsfeed manager 230 to identify content likely to be relevant to the identified user. For example, stories associated with users not connected to the identified user or stories associated with users for which the identified user has less than a threshold affinity are discarded as candidate stories. Based on various criteria, the newsfeed manager 230 selects one or more of the candidate stories for presentation to the identified user.

In various embodiments, the newsfeed manager 230 presents stories to a user through a newsfeed, which includes a plurality of stories selected for presentation to the user. The newsfeed may include a limited number of stories or may include a complete set of candidate stories. The number of stories included in a newsfeed may be determined in part by a user preference included in user profile store 230. The newsfeed manager 230 may also determine the order in which selected stories are presented via the newsfeed. For example, the newsfeed manager 230 determines that a user has a highest affinity for a specific user and increases the number of stories in the newsfeed associated with the specific user or modifies the positions in the newsfeed where stories associated with the specific user are presented.

The newsfeed manager 230 may also account for actions by a user indicating a preference for types of stories and selects stories having the same, or similar, types for inclusion in the newsfeed. Additionally, newsfeed manager 210 may analyze stories received by online system 120 from various users and obtains information about user preferences or actions from the analyzed stories. This information may be used to refine subsequent selection of stories for newsfeeds presented to various users.

The online system 140 includes a topic extraction engine 235, which identifies one or more topics associated with objects in the content store 110. To identify topics associated with content items, the topic extraction engine 235 identifies anchor terms included in a content item and determines a meaning of the anchor terms as further described in U.S. application Ser. No. 13/167,701, filed Jun. 24, 2011, which is hereby incorporated by reference in its entirety. For example, the topic extraction engine 235 determines one or more topics associated with a content item maintained in the content store 110. The one or more topics associated with a content item are stored and associated with an object identifier corresponding to the content item. In various embodiments, associations between object identifiers and topics are stored in the topic extraction engine 235 or in the content store 110 to simplify retrieval of one or more topics associated with an object identifier or retrieval of object identifiers associated with a specified topic. Structured information associated with a content item may also be used to extract a topic associated with the content item.

Figure 3:
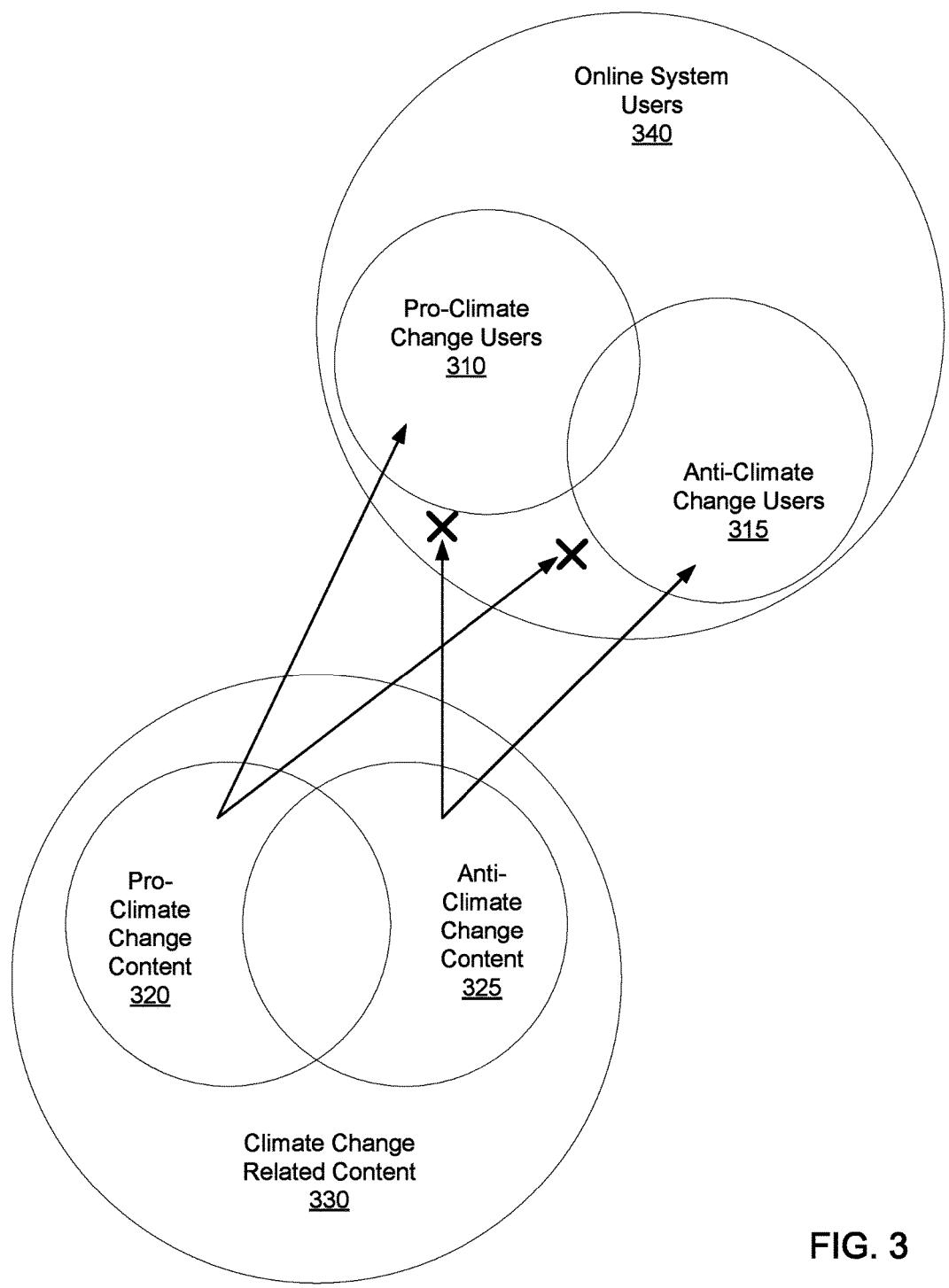
FIG. 3 illustrates an example of different audiences of users with regards to a particular topic, in accordance with an embodiment of the invention.

The audience generator 240 generates one or more audiences of users. An audience is a group of users who have a shared belief, particular treatment, attitude, opinion, view, or otherwise have a similar consensus regarding a particular topic. A particular treatment of a topic is a manner of dealing with or otherwise addressing the topic, and which may include sentiment (positive/negative), bias, level of expertise, preference, and so on. While each user may have interests in the same topic, they may be part of difference audiences. FIG. 3 illustrates an example of different audiences of users for a particular topic. As shown in FIG. 3, the online system users 340 may have users 330 that are interested in the topic of climate change. Among these users, there are pro-climate change users 310 and anti-climate change users 315. Although these two sets of users may both be interested in the topic of climate change, they may have very different treatments regarding the topic. Thus, presenting these users with all content items related to climate change may not be desirable, as users with one treatment regarding a topic may not wish to be presented with content regarding an opposing treatment regarding the topic. Thus, in addition to determining the topic that a user may be interested in (e.g., based on that users interactions with content items in the online system), the audience generator 240 generates one or more audiences for the topics and determines which users of the online system belong to each audience.

As another example, an audience may have a particular treatment of a topic that includes a preference for a particular sports team in a sport, a preference for an analytical (e.g., logical, mathematical) treatment to a topic, a preference for a policy based treatment of a topic, and a preference for more in-depth expert-level analysis of a topic, and so on. Although a few examples are indicated here, an audience may have users that have other particular treatments of a topic.

As further described below with conjunction to FIG. 4, the audience generator 240 determines that a user is part of an audience based on the actions of the user in the online system. These actions may include engagement with a particular set of pages, liking or commenting on certain content items, the contents of items posted by the user to the online system, and so on. For example, if the user engages with particular pages in the online system, and the audience generator 240 determines that those pages are a subset of pages related to a topic, the audience generator 240 may determine that the user is part of an audience based on the content of those pages. In particular, for example, those pages may have content (e.g., keywords) that indicate that climate change is not real. In such a case, the audience generator 240 may determine that the user is part of an audience of anti-climate change users.

As another example, the audience generator 240 may determine that a user's actions, indicates that a user is part of a particular audience. In particular, for example, if a user frequently checks in to a particular sports team's stadium during games, then the audience generator 240 may determine that the user is part of an audience of fans of that particular sports team (instead of simply associating that user with the broader sport itself). The audience generator 240 may also determine that a user indicating a preference (e.g., a "like") for certain content in the online system and not for others may indicate that the user is part of an audience for the preferred content.

In one embodiment, once the audience generator 240 determines that a number of seed users are part of a particular audience, the audience generator 240 further determines additional users of the online system that have a threshold level of similarity to these seed users. The audience generator 240 determines that these additional users are also part of the same audience.

The audience labeler 250 assigns one or more audiences to a posted content item. When the online system 140 receives a new posted content item, the audience labeler 250 determines an audience(s) for that content item. As further described below with conjunction to FIG. 4, in one embodiment, the audience labeler 250 presents the posting user who posts the new content item to the online system 140 with a selection of audience indicators corresponding to audiences of users in the online system. Upon receiving the indication of the audience, the audience labeler 250 stores the audience indicator with the posted content item.

In another embodiment, the audience labeler 250 determines an audience for a posted content item based on user actions within the online system. For example, the audience labeler 250 may determine an audience for a posted content item based on the actions of the posting user in the online system. Based on the audience indicators associated with content or the audiences associated with users that the posting user has performed a user action with, the audience labeler 250 may determine an audience indicator for the newly posted content item (if a certainty threshold is reached).

In another embodiment, the audience labeler 250 determines an audience for a newly posted content item by receiving from a viewing user feedback (e.g., in the form of a survey) regarding the posted content item. For example, a user may be able to select (out of a number of choices) the audience for a posted content item. The audience labeler 250 may then associate an audience indicator for this posted content item.

After generating one or more audiences and determining an audience for one or more posted content items, when presenting content items to a user, the newsfeed manager 230 of the online system 140 is able to select and rank the content items additionally according to the audience information. For example, the newsfeed manager 230 may select as sources for candidate content items to present to a user those posted content items that have an associated audience that match the audience(s) that the user is in. Furthermore, the newsfeed manager 230 may rank or determine as more relevant those content items that are associated with audiences that match or are similar to the audience(s) to which a viewing user belongs.

The web server 255 links the online system 140 via the network 120 to the one or more client devices 110, as well as to the one or more third party systems 130. The web server 140 serves web pages, as well as other web-related content, such as JAVA®, FLASH®, XML and so forth. The web server 255 may receive and route messages between the online system 140 and the client device 110, for example, instant messages, queued messages (e.g., email), text messages, short message service (SMS) messages, or messages sent using any other suitable messaging technique. A user may send a request to the web server 255 to upload information (e.g., images or videos) that are stored in the content store 210. Additionally, the web server 255 may provide application programming interface (API) functionality to send data directly to native client device operating systems, such as IOS®, ANDROID™, WEBOS® or RIM®.

Figure 4:
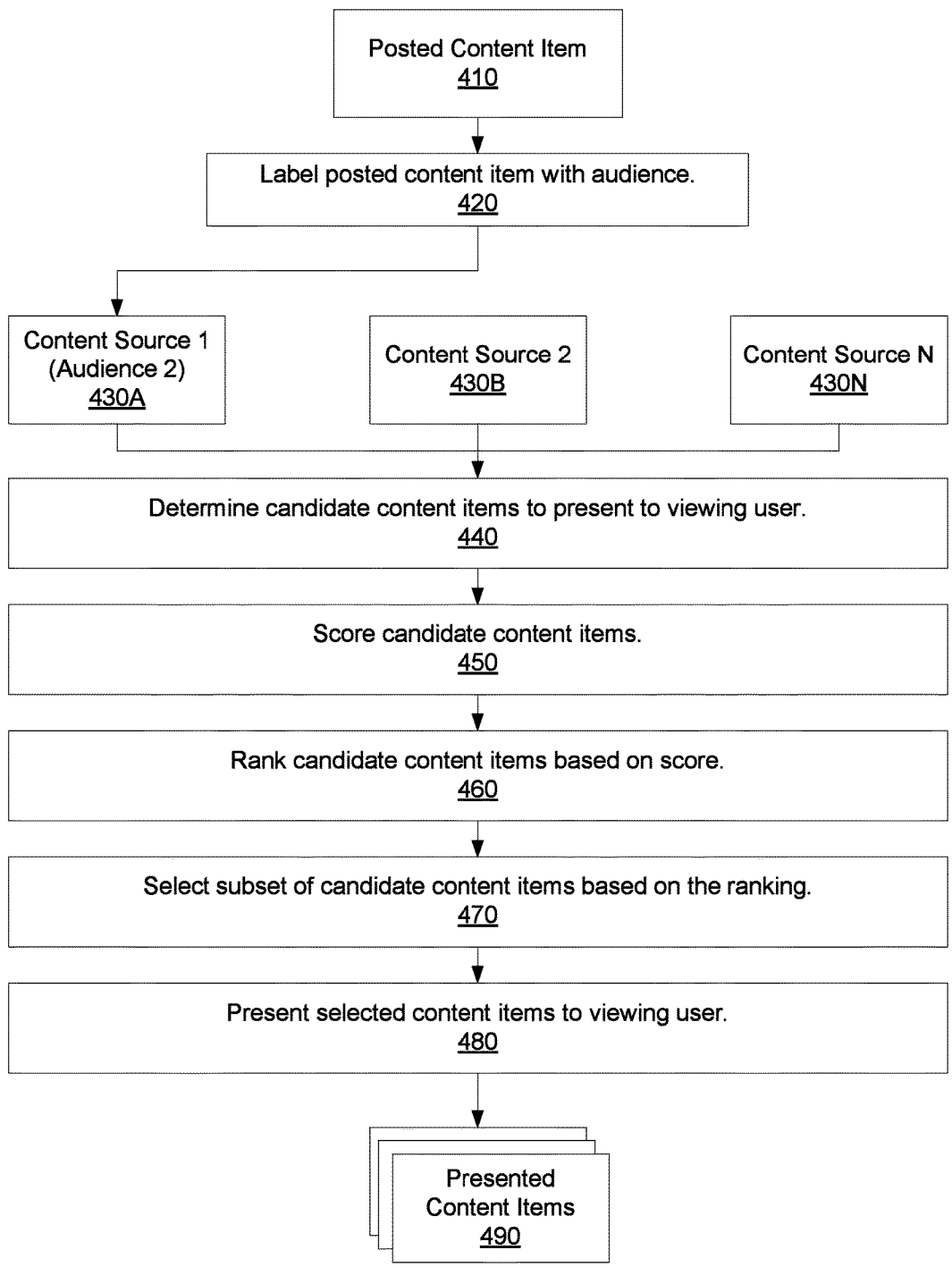
FIG. 4 is a flowchart of a method for determining an audience for a content item and presenting content items to a user based on the audience of the user, in accordance with an embodiment.

Determining an Audience for Content Items and Presenting Content Items to a User Based on the Audience of the User FIG. 4 is a flowchart of a method for determining an audience for a content item and presenting content items to a user based on the audience of the user, in accordance with an embodiment. In some embodiments, the method may include different and or additional steps than those described in conjunction with FIG. 4. Additionally, in various embodiments, steps of the method may be performed in different orders than the order described in conjunction with FIG. 4.

An online system 140 receives a new posted content item 410 from a posting user. The posting user may be any user (e.g., an individual or organization) that submits content items to the online system 140. For example, the posting user may be a news organization that submits as content items news stories to the online system 140. Although a single posted content item 410 is shown in FIG. 4, in other embodiments the online system 140 receives more than one posted content item 410 from a posting user or multiple posting users.

The online system 140 labels 420 the posted content item with an audience. In one embodiment, to determine the audience for labeling, the online system 140 provides an interface to the posting user to allow the posting user to select an audience from a maintained list of audiences for the new posted content item 410. For example, the posting user may be presented with a hierarchical menu from which the posting user may select one or more predefined audience indicators (e.g., "dog-lovers," "outdoor enthusiasts") to associate with the posted content item 410.

In one embodiment, the online system 140 determines the audience of a posted content item 410 based on feedback from users of the online system 140. The online system 140 presents the posted content item 410 to a subset of users in the online system that are determined to belong to a variety of audiences belonging to the topic that the online system 140 determines for the posted content item 410, and the online system 140 asks each user whether the user believes the content item 410 to be relevant. Once an initial set of responses is received, the online system 140 iterates by soliciting user feedback from users that are from a narrower group of audiences, but with a greater number for each audience, until a statistically significant result for the audience is indicated. Based on the response from the users, the online system 140 determines the audience for the posted content item 410.

In one embodiment, the online system 140 determines the audience for the content item 410 based on a measure of similarity of the content item 410 to other content items that have audiences associated with them. The online system 140 determines that two content items are similar based on the two content items having a threshold measure of similarity with each other. The measure of similarity may be scored: 1) based on the similarity of the actions of users of the online system 140 with the two content items, 2) based on the similarity of the actions of users of the same audience with the two content items, 3) based on a similarity of the posting user for both content items, 4) based on a similarity of the content of both content items, 5) based on a similarity of topics between the two content items, and so on. If the posted content item 410 exceeds a threshold level of similarity with a content item associated with a particular audience, the online system 140 determines that the posted content item 410 is also associated with that particular audience, and associates that posted content item 410 with a corresponding audience identifier for that audience. When multiple content items exceed the threshold level of similarity, the online system 140 may associate all their audiences with the posted content item, or may only associate with the posted content item the audience of the content item having the highest measure of similarity.

Additional details regarding determining similarity between content items and/or users are described in U.S. application Ser. No. 13/297,117, filed Nov. 15, 2011, and U.S. application Ser. No. 14/290,355, filed May 29, 2014, both of which are hereby incorporated by reference herein in their entirety.

In one embodiment, the online system 140 determines the audience for a posted content item 410 based on a classification model. The online system 140 extracts various features from the posted content item 410, such as 1) keywords in the posted content item 410, 2) the identity and other characteristics (e.g., location) of the posting user, 3) the actions of users of the online system 140 towards other content items posted by the same posting user, 4) the actions of users of the online system 140 towards similar content items, and so on, in order to determine an audience for the posted content item 410. The classification model is trained using a set of content items that have already been associated with audiences of users of the online system 140. Based on the features extracted from the training set of content items, the online system 140 trains the classification model to associate additional posted content items with audiences. For example, the model may indicate that content items posted by a particular organization are most likely to be associated with a particular audience of users. The online system 140 uses the model to classify these content items posted by the organization and associates the particular audience with these content items.

In one embodiment, to determine an initial list of audiences of users and content items associated with these audiences, the online system 140 initially selects one or more content items stored in the online system (e.g., in the content store 210). The online system 140 selects users of the online system that have performed a threshold number of actions with the selected content items. The online system 140 may further filter those users that have performed actions that have a uniform sentiment. The online system 140 may determine the sentiment based on the type of action performed on the content item. For example, a "like" action or a comment with positive keywords may indicate a positive sentiment, whereas an action to remove the content item from display may indicate a negative sentiment. Additional details regarding sentiment analysis are described in U.S. application Ser. No. 14/023,136, filed Sep. 10, 2013, which is hereby incorporated by reference in its entirety.

The online system 140 determines additional content items for which these selected users have performed a threshold number of actions. The online system 140 may filter these actions such that they are of the same sentiment as for the initially selected content item. The online system 140 determines from these additional content items those that have a threshold level of similarity to the initially selected content item. As described above, the similarity between two content items may be determined by the online system 140 based on features such as shared keywords and shared topics. The online system 140 may also determine the similarity based on whether each content item was posted to a similar location, such as a page or group of the online system 140. Each measure of similarity may be given a weighted score, and if the score for one of the additional content items exceeds the threshold, the online system 140 determines that this additional item is similar to the initially selected content item.

The online system 140 determines that those additional content items that have a threshold level of similarity with the initially selected content item are likely to share the same audience, and associates an audience to these content items. The label of the audience may be selected based on an analysis of shared keywords among the content items and the topic of the content items. In particular, the online system 140 may determine a list of top counted keywords shared among the content items, and select as the label for the audience the top keyword related to the topic. The online system 140 may separately determine that the users that were selected are a part of this audience.

Referring again to FIG. 4, the online system 140 identifies an opportunity to present content items to a viewing user and determines 440 one or more candidate content items to present to the viewing user. For example, the viewing user may access his or her news feed, which allows the online system 140 to present content items to the viewing user. As another example, the online system 140 may itself initiate the presentation of the content items to the viewing user (e.g., the online system 140 may push notifications to the viewing user via email or other channel).

In one embodiment, the online system 140 determines 440 that one or more candidate content items are selected from the one or more content sources 430. As described above in conjunction with FIG. 2, the content items may be selected from sources such as a content store, an action log, an edge store, and so on. The online system 140 can also determine the audiences that the user belongs to, and selects as a content source those content items that are associated with the audiences that the user belongs to. Referring again to FIG. 3, and as an example, if the user is in the pro-climate change users 310 audience, the online system 140 selects as a content source for that user the pro-climate change content 320.

In one embodiment, the online system 140 determines additional users that have a threshold measure of similarity and/or affinity with the viewing user, and selects as content sources 430 the content items associated with the audiences for which these additional users belong. In one embodiment, the online system 140 determines these additional users as users having at least a threshold number or percentage of characteristics, such as interests, matching or similar to characteristics of the viewing user. Similarly, the online system 140 may identify as additional users those users that have performed actions against content items of the online system 140 that share a threshold number of characteristics (e.g., keywords, topic) as content items that the viewing user has performed actions against. Other characteristics can also be utilized, such as matching demographics between the viewing user and the additional users, similar affinity scores for particular content or types of content, connections to similar content or users, similar patterns of interacting with content, etc.

Additional methods of determining similarity between groups of users of an online system are further described in U.S. patent application Ser. No. 13/297,117, filed on Nov. 15, 2011, U.S. patent application Ser. No. 14/290,355, filed on May 29, 2014, U.S. patent application Ser. No. 14/719,780, filed on May 22, 2015, all of which are hereby incorporated by reference in their entirety.

Once the online system 140 determines additional content sources based on the audiences of the additional users that have a threshold similarity to the viewing user, in one embodiment, the online system 140 determines that the viewing user should also belong to these audiences. This allows the online system 140 to expand an audience with additional users. In one embodiment, the online system 140 periodically determines for one or more audiences whether additional users should be added to the audience based on the similarity and/or affinity of those additional users to users of the audience.

In one embodiment, the online system 140 determines that the viewing user has performed a threshold number of actions with content items associated with a particular audience. Based on this, the online system 140 selects the viewing user to belong to the audience, and selects as a content source 430 the content items associated with the audience.

The online system 140 scores 450 each content item that the online system 140 has determined 440 to be a candidate content item. As described above in conjunction with FIG. 2, each candidate content item may be scored by the online system 140 based on the actions that the viewing user performed against the candidate content item, based on the actions of other users of the online system, and so on. Additionally, in one embodiment, the online system 140 determines for one or more candidate content items whether the candidate content item is associated with an audience that the viewing user belongs to. If the candidate content item is associated with an audience that the viewing user belongs to, the online system 140 increases the score given to the candidate content item.

In one embodiment, the online system 140 adjusts the score of a candidate content item that is associated with an audience that the viewing user belongs to proportionally based on an a measure of similarity and/or affinity of the viewing user and the users of the particular audience. A higher similarity and/or affinity of the viewing user to the other users of the audience may indicate that the viewing user holds stronger beliefs for the treatment supported by that audience, and thus this indicates a higher likelihood of the viewing user being interested in the candidate content item.

In one embodiment, the online system 140 adjusts the score of a candidate content item based on prior feedback from the viewing user regarding content items presented to the user that were associated with the same audience. For these previous content items, the online system 140 presents the viewing user with an option to indicate whether the user believes such content items to be relevant. The online system 140 combines the total number of relevant and non-relevant indications, and determines from these indications how strongly the viewing user prefers content items associated with that audience. The online system 140 modifies the score for a candidate content item associated with the audience based on the preference.

The online system 140 may also decrease the score of a candidate content item if that candidate content item is associated with an audience for which the viewing user does not belong to. In one embodiment, the online system 140 decreases the score based on the audience that the candidate content item is associated with. The online system 140 determines based on a list of audiences a distance score between the audience associated with a candidate content item and any audience that the viewing user belongs to. The online system 140 decreases the score of the candidate content item in proportion to the increase of the distance(s). In one embodiment, the online system 140 decreases the score in proportion with a measure of similarity and/or affinity that the viewing user has with users belonging to an audience associated with the candidate content item.

After assigning a score to each candidate content item, the online system 140 ranks 460 each content item according to the score. In one embodiment, the online system 140 normalizes the scores of each candidate content item before ranking each of them.

After ranking each candidate content item, the online system 140 selects 470 a subset of the candidate content items to present to the viewing user. In one embodiment, the online system 140 selects a predefined number of top candidate content items. A number of these top candidate content items include candidate content items that are associated with audiences for which the viewing user belongs.

After selecting the content items, the online system 140 presents 480 the selected content items to the user. In one embodiment, the online system 140 also presents to the viewing user an indication of the audience associated with each presented content item 490. The online system 140 may further indicate to the viewing user that the presented content item 490 was presented to the user due to the user's interest in the particular audience associated with the presented content item.

As an example, referring again to FIG. 3, the online system 140 determines that the user is interested in climate change related content 330 based on the actions performed by the viewing user. By also determining that the user is in the audience of pro-climate change users 310, the online system 140 is able to selectively present pro-climate change content 320 instead of anti-climate change content 325 to the user. Instead, the anti-climate change content 325 is only shown to users that are part of the audience of anti-climate change users 315.

By presenting content items to users that are associated with an audience that the user belongs to, the online system 140 is able to present more relevant content items to the user such that the user is more likely to visit the online system 140 to view content items. Furthermore, by presenting more relevant content to a user, the online system 140 is able to allow a user to more efficiently consume content items that are of interest to the user.

In one embodiment, the online system 140 also presents suggestions to a viewing based on the audiences that the viewing user belongs to. These suggestions may include suggestions to join additional groups of the online system, to connect with additional users of the online system, and/or to view additional content of the online system (e.g., sponsored content), that are associated with the audiences that the viewing user belongs to. The viewing user is more likely to engage with these suggestions as they are customized based on an estimate of the user's particular treatments.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
    maintaining, by an online system, a plurality of audiences for one or more topics, each audience comprising a group of users in the online system that share a particular treatment for a topic, the particular treatment indicating a specific manner, by the group of users, of addressing the topic that is not shared by all users that are interested in the topic, each audience associated with one or more content items that share the particular treatment of the topic, wherein an audience is initially generated by:
        selecting one or more initial content items stored in the online system to associate with the audience,
        selecting initial users to include in the audience, the initial user being users in the online system that have each performed a threshold number of actions with the initial content items, the actions performed with the initial content item having a uniform sentiment,
        selecting additional content items for which the selected users have performed the threshold number of actions and which have a threshold measure of similarity to the one or more initial content items,
        associating the additional content items with the audience,
        labeling the audience based on a keyword analysis of shared keyword among the additional content items;
    receiving, at an online system, from a client device of a posting user, a posted content item from a posting user;
    labeling the posted content item with one or more of the plurality of audiences based on information about the one or more of the plurality of audiences;
    identifying condition for presenting content to a viewing user;
    determining a plurality of candidate content items, the plurality of candidate content items including the posted content item;
    scoring each candidate content item, wherein the scoring of each candidate content item comprises:
        determining whether the candidate content item is associated with an audience that includes the viewing user; and
        responsive to the candidate content item being associated with an audience that includes the viewing user, modifying the score of the candidate content item to be higher, the viewing user included in the audience based on a similarity of the viewing user to users included in the audience;
    ranking each candidate content item of the plurality of candidate content items based on the score of each candidate content item of the plurality of candidate content items;
    selecting a subset of the plurality of candidate content items based on the ranking of each of the candidate content items of the plurality of candidate content items; and
    transmitting the selected subset of the plurality of candidate content items to a client device of the viewing user for display to the viewing user.

2. The method of claim 1, wherein the labeling the posted content item with one or more of the plurality of audiences comprises:
    presenting to the posting user an interface for submitting an indicator of an audience of the plurality of audiences for the posted content item;
    receiving an indicator of the audience from the posting user; and
    labeling the posted content item with the audience indicated by the posting user.

3. The method of claim 1, wherein the labeling the posted content item with one or more of the audiences comprises:
    presenting the posted content item to a subset of users of the online system;
    presenting an interface to the subset of users requesting an indication of the relevancy of the posted content item;
    receiving an indication of relevancy from one or more of the subset of users; and
    labeling the posted content item with the audience of those users from which a threshold number of indications of relevancy are received indicating that the posted content item is relevant.

4. The method of claim 1, wherein the labeling the posted content item with one or more of the audiences comprises:
    determining one or more additional content items of the online system that have a threshold measure of similarity with the posted content item; and
    labeling the posted content item with an audience matching the audience for the additional content items that have a threshold measure of similarity with the posted content item.

5. The method of claim 1, wherein the score of the candidate content item is modified based on a measure of similarity between the viewing user and other users of the audience, the audience associated with the content item being the audience of the viewing user.

6. The method of claim 1, wherein the score of the candidate content item is modified based prior feedback from the viewing user regarding content items associated with the audience, the audience associated with the content item being the audience of the viewing user.

7. The method of claim 1, wherein the scoring of each candidate content item further comprises:
   in response to the audience associated with the candidate content item not being an audience that the viewing user belongs to, decreasing the score of the candidate content item.

8. The method of claim 1, wherein the presenting the selected subset to the viewing user further comprises:
   presenting an indication to the user of the audience associated with one or more of the presented content items.

9. A method comprising:
   maintaining, by an online system, a plurality of audiences for one or more topics, each audience comprising a group of users in the online system that share a particular treatment for a topic, the particular treatment indicating a specific manner, by the group of users, of addressing the topic that is not shared by all users that are interested in the topic, each topic including one or more content items, wherein an audience is initially generated by:
      selecting seed content items stored in the online system to include in the audience,
      selecting users of the online system that have performed a threshold number of actions with the seed content items, the actions having a uniform sentiment, the users included in the audience,
      selecting additional content items for which the selected users have performed a threshold number of actions, the actions having the same uniform sentiment, the additional content items included in the audience,
      labeling the audience based on a keyword analysis of shared keyword among the additional content items;
   receiving, at an online system, a plurality of content items;
   labeling one or more of the plurality of content items with one or more of the plurality of audiences based on information about the one or more of the plurality of audiences;
   identifying a condition for presenting a plurality of selected content items to a viewing user;
   determining a plurality of candidate content items for the viewing user by:
      identifying one or more audiences for the viewing user; and
      selecting as candidate content items content associated with the one or more audiences;
   scoring the candidate content items based on interactions of the viewing user in the online system;
   ranking each candidate content item of the plurality of candidate content items based on the score for each of the candidate content items;
   selecting a subset of the plurality of candidate content items based on the ranking of each of the candidate content items of the plurality of candidate content items; and
   presenting transmitting the selected subset of the plurality of candidate content items to to a client device of the viewing user for display to the viewing user.

10. The method of claim 9, wherein the determining a plurality of candidate content items for the viewing user further comprises:
   determining one or more additional users with a threshold measure of similarity to the viewing user; and
   selecting as candidate content items content associated with the one or more audiences of the one or more additional users.

11. The method of claim 10, further comprising:
   determining that the viewing user belongs to the one or more audiences of the one or more additional users.

12. The method of claim 9, wherein the determining a plurality of candidate content items for the viewing user further comprises further comprises:
   determining that the viewing user has performed a threshold number of interactions with a stored content item of the online system associated with an audience of the stored content item; and
   selecting as candidate content items content associated with the audience of the stored content item.

13. A computer program product comprising a computer readable storage medium having instructions encoded thereon that, when executed by a processor, cause the processor to:
   maintain, by an online system, a plurality of audiences for one or more topics, each audience comprising a group of users in the online system that share a particular treatment for a topic, the particular treatment indicating a specific manner, by the group of users, of addressing the topic that is not shared by all users that are interested in the topic, each audience associated with one or more content items that share the particular treatment of the topic, wherein an audience is initially by further instructions encoded on the computer readable storage medium, that when executed by the processor, cause the processor to:
      select one or more initial content items stored in the online system to associate with the audience,
      select initial users to include in the audience, the initial user being users in the online system that have each performed a threshold number of actions with the initial content items, the actions performed with the initial content item having a uniform sentiment,
      select additional content items for which the selected users have performed the threshold number of actions and which have a threshold measure of similarity to the one or more initial content items,
      associate the additional content items with the audience,
      label the audience based on a keyword analysis of shared keyword among the additional content items;
   receive at an online system, from a client device of a posting user, a posted content item from a posting user;
   label the posted content item with one or more of the plurality of audiences based on information about the one or more of the plurality of audiences;
   identify condition for presenting content to a viewing user;
   determine a plurality of candidate content items, the plurality of candidate content items including the posted content item;
   score each candidate content item, wherein the scoring of each candidate content item comprises:

determining whether the candidate content item is associated with an audience that includes the viewing user; and responsive to the candidate content item being associated with an audience that includes the viewing user, modifying the score of the candidate content item to be higher, the viewing user included in the audience based on a similarity of the viewing user to users included in the audience;

rank each candidate content item of the plurality of candidate content items based on the score of each candidate content item of the plurality of candidate content items;

select a subset of the plurality of candidate content items based on the ranking of each of the candidate content items of the plurality of candidate content items; and transmit the selected subset of the plurality of candidate content items to a client device of the viewing user for display to the viewing user.

14. The computer program product of claim 13, wherein the computer-readable storage medium further has instructions encoded thereon for the labeling the posted content item with one or more of the plurality of audiences, that, when executed by the processor, cause the processor to:

present to the posting user an interface for submitting an indicator of an audience plurality of for the posted content item;

receive an indicator of the audience from the posting user; and label the posted content item with the audience indicated by the posting user.

15. The computer program product of claim 13, wherein the computer-readable storage medium further has instructions encoded thereon for the labeling the posted content item with one or more of the audiences, that, when executed by the processor, cause the processor to:

present the posted content item to a subset of users of the online system;

present an interface to the subset of users requesting an indication of the relevancy of the posted content item;

receive an indication of relevancy from one or more of the subset of users; and label the posted content item with the audience of those users from which a threshold number of indications of relevancy are received indicating that the posted content item is relevant.

16. The computer program product of claim 13, wherein the computer-readable storage medium further has instructions encoded thereon for the labeling the posted content item with one or more of the audiences, that, when executed by the processor, cause the processor to:

determine one or more additional content items of the online system that have a threshold measure of similarity with the posted content item; and label the posted content item with an audience matching the audience for the additional content items that have a threshold measure of similarity with the posted content item.

17. The computer program product of claim 13, wherein the score of the candidate content item is modified based on a measure of similarity between the viewing user and other users of the audience, the audience associated with the content item being the audience of the viewing user.

18. The computer program product of claim 13, wherein the score of the candidate content item is modified based prior feedback from the viewing user regarding content items associated with the audience, the audience associated with the content item being the audience of the viewing user.

19. The computer program product of claim 13, wherein the scoring of each candidate content item further comprises:

in response to the audience associated with the candidate content item not being an audience that the viewing user belongs to, decreasing the score of the candidate content item.

20. The computer program product of claim 13, wherein the presenting the selected subset to the viewing user further comprises:

presenting an indication to the user of the audience associated with one or more of the presented content items.

* * * * *

UNITED STATES PATENT AND TRADEMARK OFFICE
CERTIFICATE OF CORRECTION

PATENT NO. : 10,122,808 B2
APPLICATION NO. : 15/095007
DATED : November 6, 2018
INVENTOR(S) : David Vickrey and Khalid Bakry El-Arini It is certified that error appears in the above-identified patent and that said Letters Patent is hereby corrected as shown below:

In the Claims

Column 17, Lines 1-2, delete "keyword analysis of shared keyword among the additional content items" and insert -- keyword analysis of shared keywords among the additional content items --

Column 17, Line 5, delete "modified based prior feedback" and insert -- modified based on prior feedback --

Column 17, Lines 43-44, delete "keyword analysis of shared keyword among the additional content items" and insert -- keyword analysis of shared keywords among the additional content items --

Column 18, Line 1, delete "presenting transmitting" and insert -- transmitting --

Column 18, Line 2, delete "items to to a client" and insert -- items to a client --

Column 18, Line 17, delete "further comprises further comprises" and insert -- further comprises --

Column 18, Lines 53-54, delete "keyword analysis of shared keyword among the additional content items" and insert -- keyword analysis of shared keywords among the additional content items --

Column 19, Lines 26-27, delete "audience plurality of for the posted content item" and insert -- audience plurality of the posted content item --

Column 20, Lines 23-24, delete "modified based prior feedback" and insert -- modified based on prior feedback --

Signed and Sealed this
Fourth Day of June, 2019

Andrei Iancu
*Director of the United States Patent and Trademark Office*